United States Patent [19]

Falbel

[11] 4,328,421
[45] May 4, 1982

[54] HORIZON SENSOR

[75] Inventor: Gerald Falbel, Stamford, Conn.

[73] Assignee: Barnes Engineering Company, Stamford, Conn.

[21] Appl. No.: 124,429

[22] Filed: Feb. 25, 1980

[51] Int. Cl.³ .............................................. G01J 1/00
[52] U.S. Cl. .................................... 250/347; 250/236
[58] Field of Search ............... 250/347, 236, 234, 235, 250/203 R, 231 SE; 350/6.9, 6.91, 6.5, 6.7, 6.1, 6.6, 6.8

[56] References Cited

U.S. PATENT DOCUMENTS

| | | | |
|---|---|---|---|
| 3,020,407 | 2/1962 | Merlen | 250/347 |
| 3,038,077 | 6/1962 | Gillespie, Jr. et al. | 250/234 |
| 3,121,165 | 2/1964 | Astheimer et al. | 250/347 |
| 3,381,569 | 5/1968 | Hatcher | 250/347 |
| 3,383,511 | 5/1968 | Palser | 250/203 R |
| 3,408,492 | 10/1968 | Astheimer | 350/6.8 |
| 3,637,281 | 1/1972 | Gull | 350/6.7 |
| 3,742,238 | 6/1973 | Hoffman | 350/6.91 |
| 3,887,263 | 6/1975 | Thompson | 250/203 R |
| 4,233,592 | 11/1980 | Leichle | 250/231 SE |

*Primary Examiner*—Alfred E. Smith
*Assistant Examiner*—Carolyn E. Fields
*Attorney, Agent, or Firm*—Parmelee, Johnson, Bollinger & Bramblett

[57] ABSTRACT

A family of two axis horizon sensors using the same basic scan technique is provided which achieves a relatively wide altitude range with a minimum of moving parts for performing vehicle attitude control and guidance. The horizon sensor for indicating the orientation of a space vehicle senses a line of discontinuity in optical radiation between a reference planet and outer space in at least two planes using a single sensor which includes a single detector means for detecting the optical radiation. The detector is scanned across the line of discontinuity in at least two planes. The scanner includes a rotary element driven by a single motor having at least two stationary reflecting elements positioned therearound. A phase reference signal generator is coupled to the motor and driven in synchronism therewith for generating at least two reference signals at predetermined points in the scan. Electronic circuitry is provided utilizing the reference signals and the signals generated by the detector for measuring rotational intervals between the reference signals and the detector signals for determining the attitude of the sensor in the two mutually perpendicular axes.

The stationary reflecting mirrors may be two, three or four in number each of which scans the detector over a different pattern across the planet used as a reference for attitude control. Advantageously, in accordance with the present invention, the family of two axis sensors requires only one sensor head, one scanning motor, one detector all of which are housed in one package.

12 Claims, 10 Drawing Figures

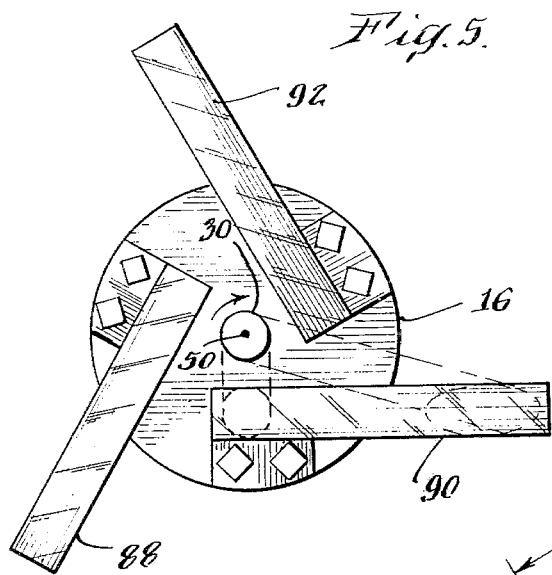
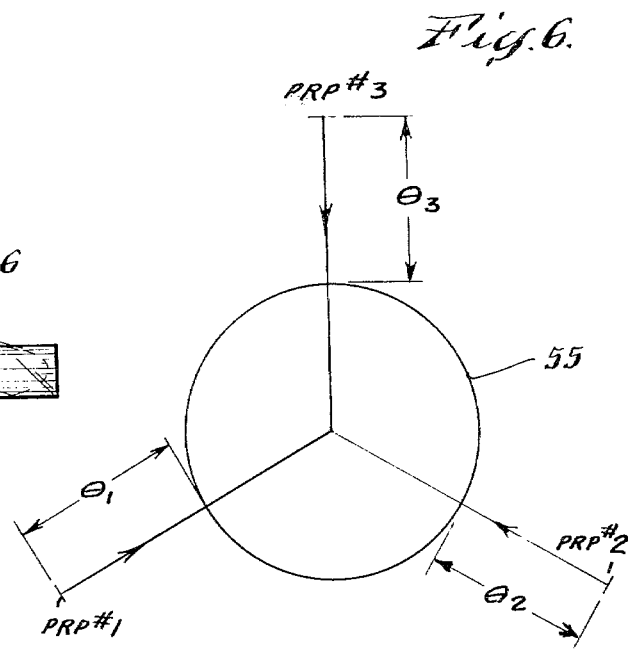
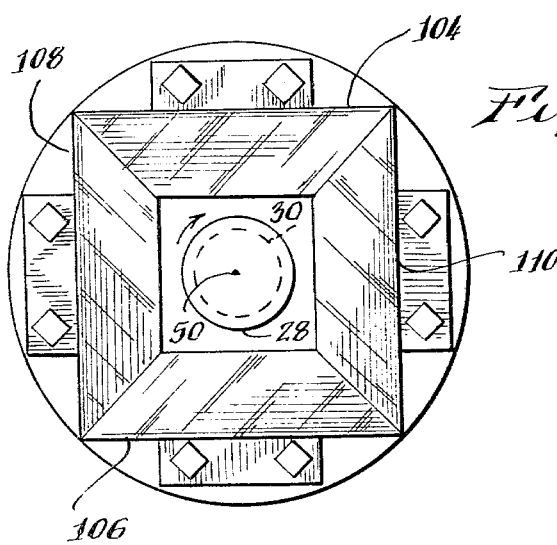
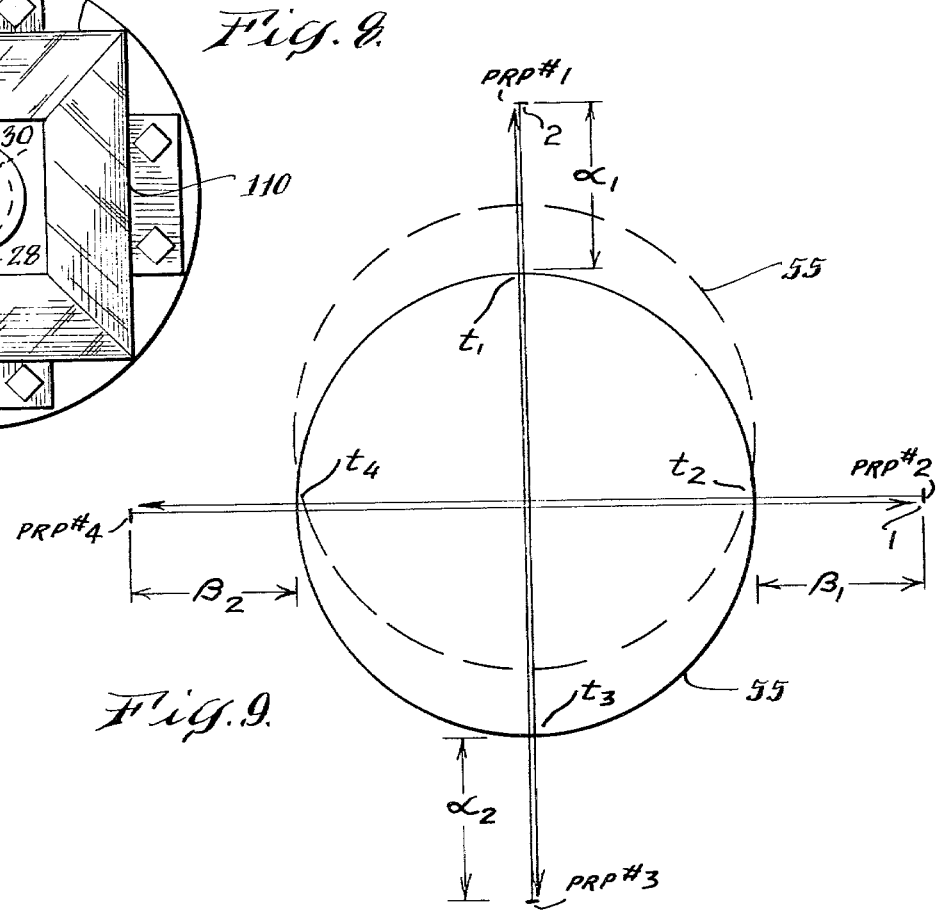

HORIZON SENSOR

BACKGROUND OF THE INVENTION

This invention relates to a horizon sensor for indicating orientation by sensing a line of discontinuity in optical radiation primarily in the infrared range between a reference planet and outer space utilizing a single set of optics and one scanning element to provide two axis information.

Horizon sensors are devices which are mounted in satellites, missiles, space probes, extremely high flying aircraft and the like which sense the horizon of a reference planet and produce a signal which indicates orientation with respect thereto. Almost all unmanned satellites employ horizon sensors for attitude control and guidance of the satellite. The attitude of the satellite is determined by its position with respect to three axes at right angles to each other. Two of these axes are in a plane at right angles to a projected radius of the earth passing through the satellite and the third coincides with such radius. The plane in which the first two axes lie is parallel to the earth's horizon and it is with information on the attitude with respect to these two axes that the present invention deals. Once the orientation of the satellite with respect to these two axes is determined, orientation around the other axis can be determined by other means utilizing gyroscopes, or observation of heavenly bodies.

One very successful type of horizon sensor is shown and described in U.S. Pat. No. 3,020,406, which is assigned to the assignee of the present invention, which utilizes the horizon representing a line of discontinuity between the earth's atmosphere and outer space. This line of discontinuity is characterized by a large difference in infrared radiation between outer space which is cold providing very little infrared radiation whereas the earth is considerably warmer and provides a large amount of infrared radiation as compared with space. Accordingly, the horizon represents a sharp line of discontinuity which provides an abrupt and sharp change in infrared radiation on either side of it. This characteristic is utilized by scanning an infrared detector in a conical scan pattern across the horizon and deriving an electrical output signal marking the line of discontinuity. Reference pulses are also generated as the scan passes predetermined points in the vehicle. The intervals between the horizon crossings and the reference pulses are compared to produce an output signal which provides information with respect to the attitude of the vehicle with respect to the horizon. The type of conical scan sensors as set forth in the aforesaid patent have proven extremely successful in space flight and are used on many manned and unmanned satellites.

The disadvantage of the aforesaid sensor resides in the fact that two sensor heads spaced 90° apart on the satellite or space vehicle are required to provide two axis information thus one head is required to provide information for each axis. This increases the weight, power and cost of the system as well as providing more moving parts thereby increasing the chance of a malfunction based on a greater number of moving parts.

SUMMARY

Accordingly, it is an object of this invention to provide a new and novel horizon sensor which employs a single sensor head for achieving two axis attitude information over a wide altitude range.

A further object of this invention is to provide a new and improved horizon sensor which provides both pitch and roll attitude information utilizing a single scanning element and one set of optics, a single scanning motor and a single detector.

Another object of this invention is to provide a new and improved horizon sensor which uses the same basic scan technique to provide a family of two axis sensors.

A further object of this invention is to provide a new and improved horizon sensor which may employ only reflective optics.

Still a further object of this invention is to provide the horizon sensor which achieves a relatively wide altitude range of operation wih a minimum of moving parts and in which the entire sensor may be housed in one package.

A further object of this invention is to provide a new and improved horizon sensor in which attitude readout information is readily provided in digital form simplifying the electronics and increasing the accuracy of the system.

In carrying out this invention in one illustrative embodiment thereof, a horizon sensor is provided for indicating orientation by sensing a line of discontinuity in optical radiation between a reference planet and outer space in at least two planes using a single sensor head. A detector means is scanned across a line of discontinuity in at least two planes with the detector means generating signals providing an indication of the line of discontinuity. The scanning means for scanning the detector across the line of discontinuity includes a rotary element with at least two stationary reflecting elements positioned therearound. A driving means in the form of a motor is provided for driving the rotary element and a reference generating means is coupled to the driving motor and driven in synchronism therewith for generating at least two reference signals at predetermined points in the scan by the scanning means. Electronic circuitry is provided to which the reference signals and the detector signals are applied for measuring the rotational intervals or time intervals between the horizon crossings and the reference pulses to produce an output signal which provides attitude information with respect to the horizon.

Different scan patterns may be provided by changing the number of stationary reflective elements positioned around the rotary scanning element. Two, three or four reflective elements are disclosed for providing such different scan patterns.

Advantageously, this family of two axis horizon sensors use the basic scan technique which achieves a relatively wide altitude range of operation with a minimum of moving parts. The horizon sensors may use reflective optics only, and only one set of optics and one scanning element with only one detector is used for two axis information with the entire sensor being housed in one package.

BRIEF DESCRIPTION OF THE DRAWINGS

The invention, together with further objects, aspects and advantages thereof, will be better understood from the following description taken in connection with the accompanying drawings in which the same elements bear the same reference numerals.

FIG. 5 is a front view of another embodiment of the present invention utilizing three stationary mirrors for providing a star scanning pattern.

FIG. 6 is a diagrammatic illustration showing the star scanning pattern which is generated by the embodiment illustrated in FIG. 5.

FIG. 8 is a front view of a horizon sensor utilizing four fixed mirrors for producing a cross scan pattern embodiment in accordance with the present invention.

FIG. 9 schematically illustrates the cross scan pattern generated by the sensor of FIG. 8 and will be used in explaining the derivation of attitude control systems using that type of scan.

DESCRIPTION OF THE PREFERRED EMBODIMENTS

Figure 1:
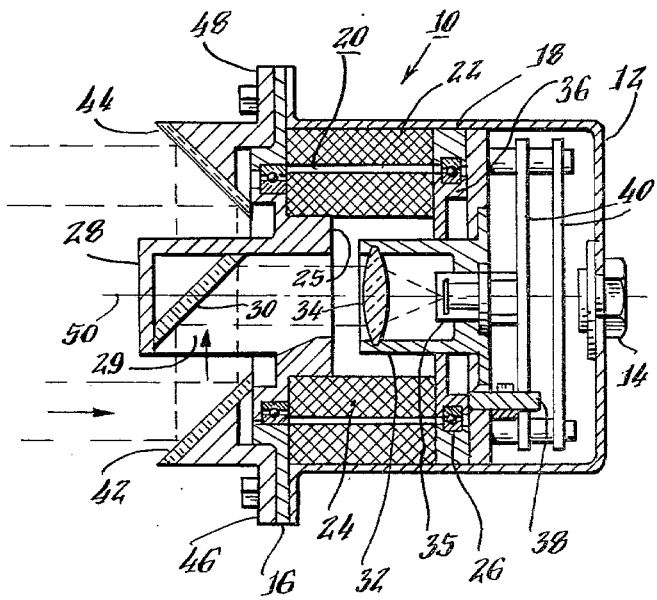
FIG. 1 is a vertical section through a sensor head using a two fixed mirror embodiment of the present invention.

Referring now to FIG. 1, a sensor, referred to generally with the reference character 10, comprises a housing 12 having a lead coupling 14 on the back thereof and a front plate 16. A hollow shaft motor, referred to generally with the reference character 20, has a stator 22 mounted in said housing and a rotor 24 mounted in a rotating assembly 25 on bearings 26 on the stator mounting assembly 18. The rotating assembly 25 includes a turret 28 having an opening 29 therethrough which communicates with an optical element 30 which in effect, as will be explained hereinafter, scans the field of view for the sensor 10. The optical element 30 is illustrated in the form of a 45° mirror, but it will be appreciated that other angles and other types of optical elements such as prisms may be utilized for performing the scanning function.

The scanner or turret 28 directs radiation received from the field of view through opening 29 which is reflected from the mirror 30 to a detector module 32 which includes an objective lens 34 and a detector 35. The detector 35 is sensitive to the radiation imaged thereon which for horizon sensor applications will be primarily in the infrared region. Accordingly, detector 35 is an infrared detector, for example, a pyroelectric detector, a thermistor bolometer, a thermopile, etc. A phase reference disc 36 having a plurality of holes or notches spaced on the periphery thereof is attached to the rotating assembly 25. A phase reference pickup which may be in the form of a light emitting diode will produce a reference pulse at predetermined intervals where the holes or notches occur which bear a relationship to the position of the turret 28 in a particular scan position. The reference signals will be generated as desired in accordance with a particular application and may occur at different periods during the scan depending on the type of scan of the planet which is utilized as well as the electronic processing employed. The times at which the reference pulses are generated will be indicated in the various embodiments described hereinafter. The above described sensor also houses electronic circuitry which may be mounted on a plurality of circuit boards 40. The boards 40 are illustrated without components for clarity as the processing circuitry will be explained with respect to FIGS. 4, 7 and 10 for the different embodiments of the sensor 10.

The motor 20 may be an induction type or commutated dc motor or a stepper type motor. The stepper type motor is preferred in some cases because of its greater simplicity and efficiency of its drive circuitry. One form of stepper motor which may be employed is the Schaeffer Magnetics 3° stepper motor using a step rate of 240 steps per second. With this motor the sensor 10 can be operated at a 120 rpm or 2 rps. The stepper motor 20 has a reproducibility and accuracy of the step positions of better than 0.1° and at the 240 steps per second the motor produces a smooth rotation rate without "cogging". This discrete position vs. pulse number characteristic of the preferred Schaeffer motor can be used to advantage in simplifying the electronic processing in an all digital systems which can ultimately be implemented with a microprocessor.

Figure 2:
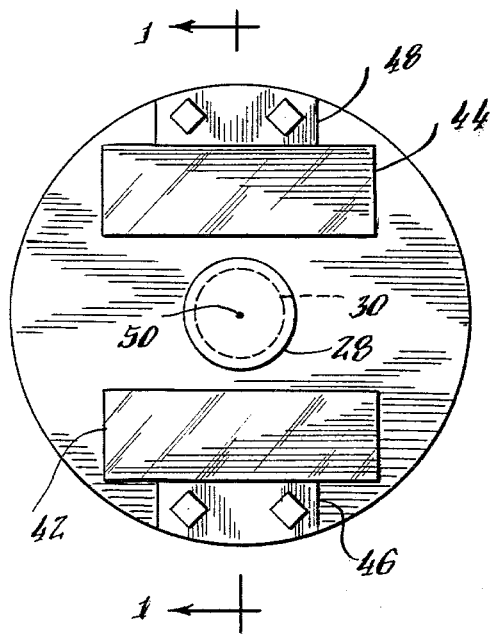
FIG. 2 is a front view of the two stationary mirror embodiment illustrated in FIG. 1.
Figure 3:
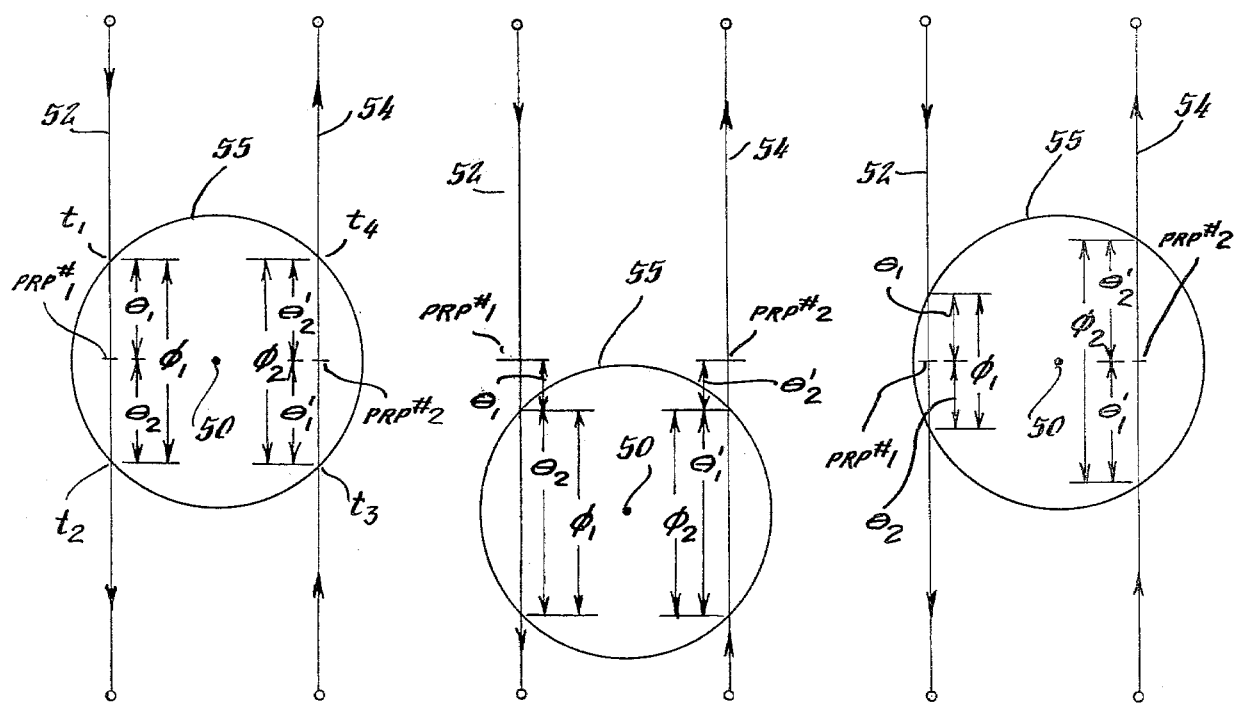
FIG. 3 diagrammatically illustrates the scan pattern of the embodiment illustrated in FIG. 1 and illustrates the derivation of output signals from such a scan pattern.

The basic horizon sensor 10 configuration which is utilized for a family of sensors has been described above. Depending upon the planet's angle to be measured and the particular application in which the sensor is used, one of three variations to the aforesaid basic configuration will be utilized. The first configuration or embodiment is illustrated in FIGS. 1 and 2 in which plane mirrors 42 and 44 having flanges 46 and 48, respectively are mounted on the front plate 16 of the sensor 10 in diametric relationship on opposite sides of the rotating turret 28. Accordingly, the scanning mechanism of the first embodiment essentially comprises an axial scanning mirror 30 which projects the detector 35 field of view onto two plane mirrors 42 and 44 mounted on parallel axes orthogonal to the optical axis 50 of the sensor 10. The angle made by plane mirror 42 or 44 with the optical axis 50 will always be equal to the angle made by the opposite mirror and the angles illustrated in FIG. 1 are plus and minus 45°. It will be apparent that different angles may be utilized for the plane mirrors 42 and 44 as long as the angle made by one mirror with the optical axis 50 is equal to the angle made by the opposite mirror and the angles chosen will depend upon the particular application. When the mirrors 42 and 44 are in the plus and minus 45° angles about the optical axis, the scanning beam will produce two fan-shaped scan planes across the planet disc 55 being scanned. These scan planes have an angle between them which cause the field of view to transverse the planet disc offset from its center as illustrated in FIG. 3 by the scan lines 52 and 54 which moves in opposite directions indication by the arrows across the earth disc 55. The angle of the fan-shaped scan will be determined by the length of the mirrors 42 and 44 as well as their distance from the optical axis. FIG. 3 illustrates on the left a planet centered in pitch and roll while in the center shows a planet shifted about the pitch axis and on the right shows the planet shifted about the roll axis.

Figure 4:
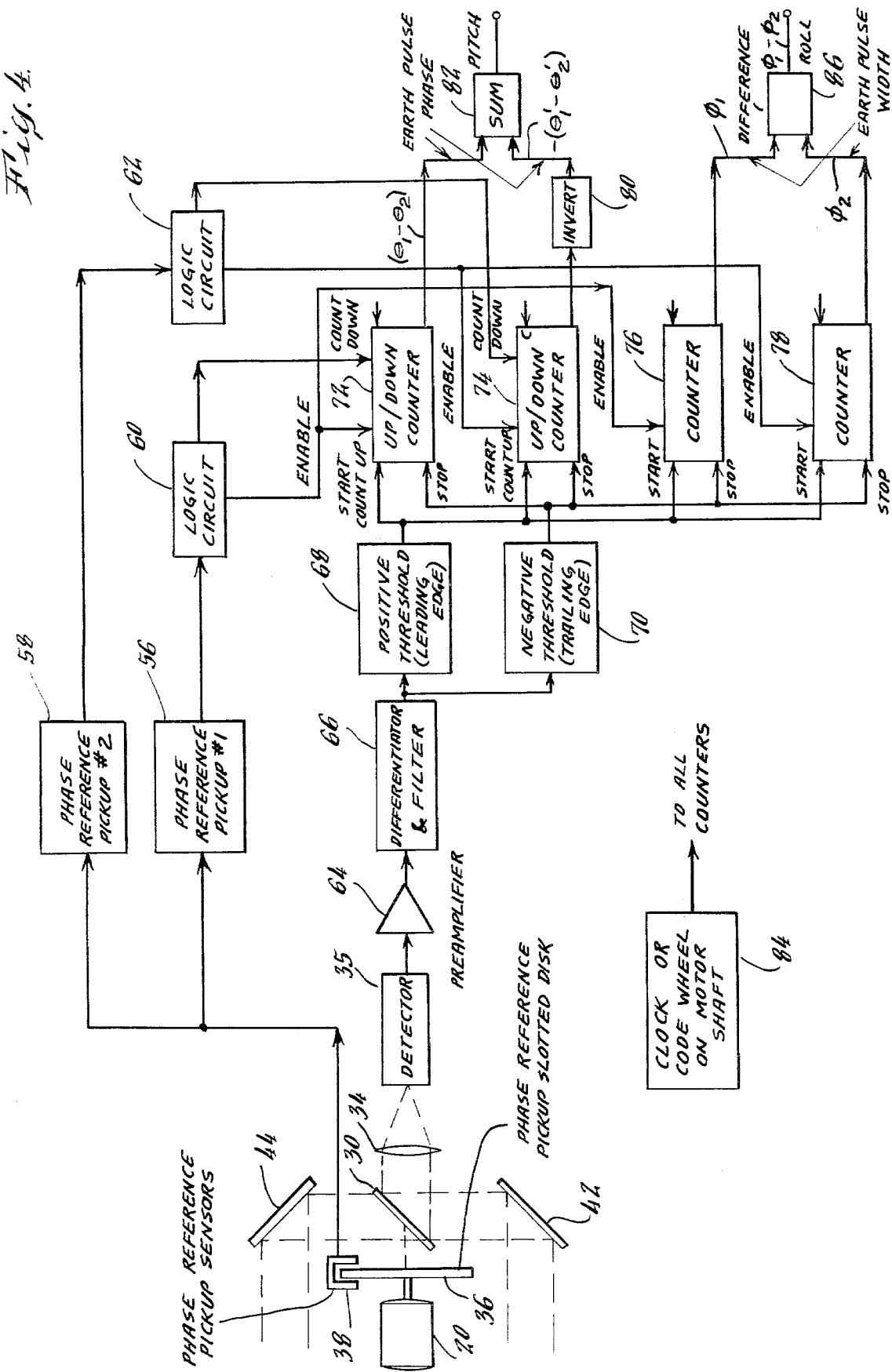
FIG. 4 is a system block diagram for the horizon sensor illustrated in FIG. 1.

FIG. 4 illustrates one method of deriving output signals for the horizon sensor 10 using two fixed mirrors as illustrated in FIGS. 1 and 2 with the scan patterns illustrated in FIG. 3. As is illustrated schematically in FIG. 4, the motor 20 rotates the plane reflecting mirror 30 and at the same time drives a phase reference pickup slotted disc 36 having the pickup 38 positioned on the periphery thereof for generating phase reference signals which are applied to phase reference pickup 56 and phase reference pickup 58 for generating PRP #1 and PRP #2, respectively which are applied to logic circuits 60 and 62, respectively. The purpose of the logic circuits 60 and 62 is to determine which scan either 52 or 54 is being traced across the planet disc 55 and further to enable certain counters and to reverse the count in certain counters during predetermined times during the scan.

The detector 35 is scanned over the field of view of the sensor 10 by the rotary scanning element 30 and the stationary plane mirrors 42 and 44 which are in diametrically opposed positions on opposite sides of the rotary element 30. Output signals from the detector 35 are applied to and amplified by a preamplifier 64 and then applied to a differentiator and filter circuit 66. The electrical output of the detector 35 resulting from optical radiation applied to it by continuously scanning across the horizon is a signal in the form of a square wave or regular repeating rectangular pulses the leading edge of which correspond to scanning from space to earth while the trailing edge is the downward slope of the pulse corresponding to the earth to space crossing. The preamplifier 64 and the differentiator and filter 66 amplify and shape the detector signals which are then applied to positive and negative threshold circuits 68 and 70, respectively. Since space to planet crossings are used in the processing, the detector signals may be clamped to a zero radiation level of space prior to each horizon crossing and the horizon crossing times $t_1$ and $t_3$ as illustrated in FIG. 3 will be established when the detector signal waveform exceeds a fixed threshold set by the positive threshold circuit 68 for scan 52 and a negative threshold over the space clamp level set by negative threshold circuit 70 for scan 54 which is opposite in sign simply because the scanning direction is reversed. The threshold levels of the positive and negative threshold circuits should be low to reduce errors caused by variations in limb radiance around the planet.

All processing after thresholding in positive and negative thresholds 68 and 70 is digital, since the respective time intervals which will be utilized to determine tilt in two orthogonal planes of pitch and roll are now in terms of pulse counts. As the description progresses, it should be pointed out that in determining attitude, the horizon sensor 10 sums the energy between reference signal pulses and adjacent horizon crossings which are basically measurements of angular rotation between the crossings and the reference signals. If the rotation is constant over each scan cycle determined by the reference pulses, uniformity of rotational speed becomes unimportant and the rotational intervals correspond to time intervals. It should be appreciated, however, the time interval measurement is only a measurement which is proportional to the basic scan rotational intervals and that angular motion is actually what is being utilized to determine the attitude of the vehicle with respect to the horizon.

As previously stated, the scan pattern projected on the planet disc 55 utilizing the two stationary mirrors and the rotating element as illustrated in FIG. 1, is shown in FIG. 3. The angle between the scan planes is equal to the average angle produced by the horizon crossing in the scan planes, and this effectively projects the scan lines 52 and 54 on the planet disc 55 in which the subtended angle $\phi$ in the scan planes can be represented as chords on the planet disc and these chords are separated by a distance equal to their average length. The two axis error signals are produced based on the time relationship of the horizon crossovers to a reference PRP #1 or PRP #2 with respect to scan patterns 52 and 54, respectively which provides one axis orientation. This time relationship is expressed as $\theta$ and accordingly, as shown on the left of FIG. 1 when $\theta_1 - \theta_2 = 0$ in the scan plane or line 52 and $-(\theta_1' - \theta_2') = 0$ then the planet is centered on the pitch axis. The other axis orientation is determined by the difference between the measured electrical angle $\phi$ in each scan plane. Accordingly, when $\phi_1 - \phi_2 = 0$ the planet is centered in the roll axis and the vehicle in which the sensor 10 is located has no tilt with respect to the planet being tracked. The center of FIG. 3 illustrates a shift about the pitch axis while the right illustration in FIG. 3 shows the planet shifted about the roll axis.

One way of implementing the aforesaid deviations is shown in FIG. 4 which employs up/down counters 72 and 74 and counters 76 and 78 which have the positive threshold (leading edge) 68 signals applied to the start inputs of all of the aforesaid counters and a negative threshold (trailing edge) 70 signals applied to the stop inputs of the aforesaid counters. Up/down counter 72 and counter 76 are enabled and controlled by logic circuit 60 in response to the phase reference pickup 56 while up/down counter 74 and counter 78 are enabled and controlled by logic circuit 62 from phase reference pickup 58. Accordingly, logic circuits 60 and 62 determine whether scan lines 52 or 54 are being traced across the planet disc with the count starting at each horizon crossing the up/down counter 72 being activated when line 52 is scanned while up/down counter 74 is utilized when line or plane 54 is being scanned. When the negative threshold circuit 70 is activated corresponding to a planet to space crossing, the counts on all the counters are stopped. The output of up/down counter 72 is a measure of $\theta_1 - \theta_2$ while the output of up/down counter 74 after being inverted by an inverter 80 represents $-(\theta_1' - \theta_2')$ which are both applied to a summing network 82 to provide a pitch output error signal. As will be observed in FIG. 3 on both the right and left illustration, no pitch error is generated while in the center of FIG. 3, a maximum pitch error is provided in view of the lack of $\theta_1'$ or $\theta_2'$ signals.

It should be pointed out that a clock 84 is connected to all of the counters 72, 74, 76 and 78. A clock may be utilized only when a uniform angular velocity is provided by the scanning motor 20 otherwise a code wheel may be mounted on the motor shaft for generating the clock or timing pulses.

The counters 76 and 78 with counter 76 measuring $\phi_1$ and counter 78 measuring $\phi_2$ have their outputs applied to a difference circuit 86 for providing a roll error signal. Again, observing FIG. 3, no roll error exists on the left and center illustrations of FIG. 3 because $\phi_1 - \phi_2 = 0$. However, the right side illustration of FIG. 3 illustrates a difference in $\phi_1$ and $\phi_2$ thereby providing an error signal from the difference circuit 86 representing the roll axis error signal.

A variety of mechanisms may be used to correct the attitude of any object moving outside of the earth's atmosphere provided the magnitude of the departure of the moving object from the predetermined desired attitude is known. Such mechanisms simply require information preferably in the form of electrical signals as are generated by the sum and difference circuits 82 and 86 which in effect measure the departure of the vehicle from the predetermined attitude. Accordingly, once having these signals the attitude may be corrected. The mechanisms utilized for such correction form no part of the present invention as they have been utilized in the past and are considered conventional.

Referring now to FIGS. 5 and 6 in accordance with another embodiment of the present invention, the sensor of FIG. 1 may be modified by replacing the plane mirrors 42 and 44 with three stationary, radially placed, flat mirrors 88, 90 and 92 mounted by their respective flanges onto the front plate 16. The three radially placed, flat mirrors 88, 90 and 92 which make an angle of 45° with the optical axis 50 and if extended, would form therebetween a 60° equilateral triangle provide in conjunction with the scanning mirror 30 a "star scan" illustrated in FIG. 6. This type of scan pattern will be useful at high altitudes. The altitude range can be extended to lower altitudes by lengthening the radial mirrors 88, 90 and 92.

Figure 7:
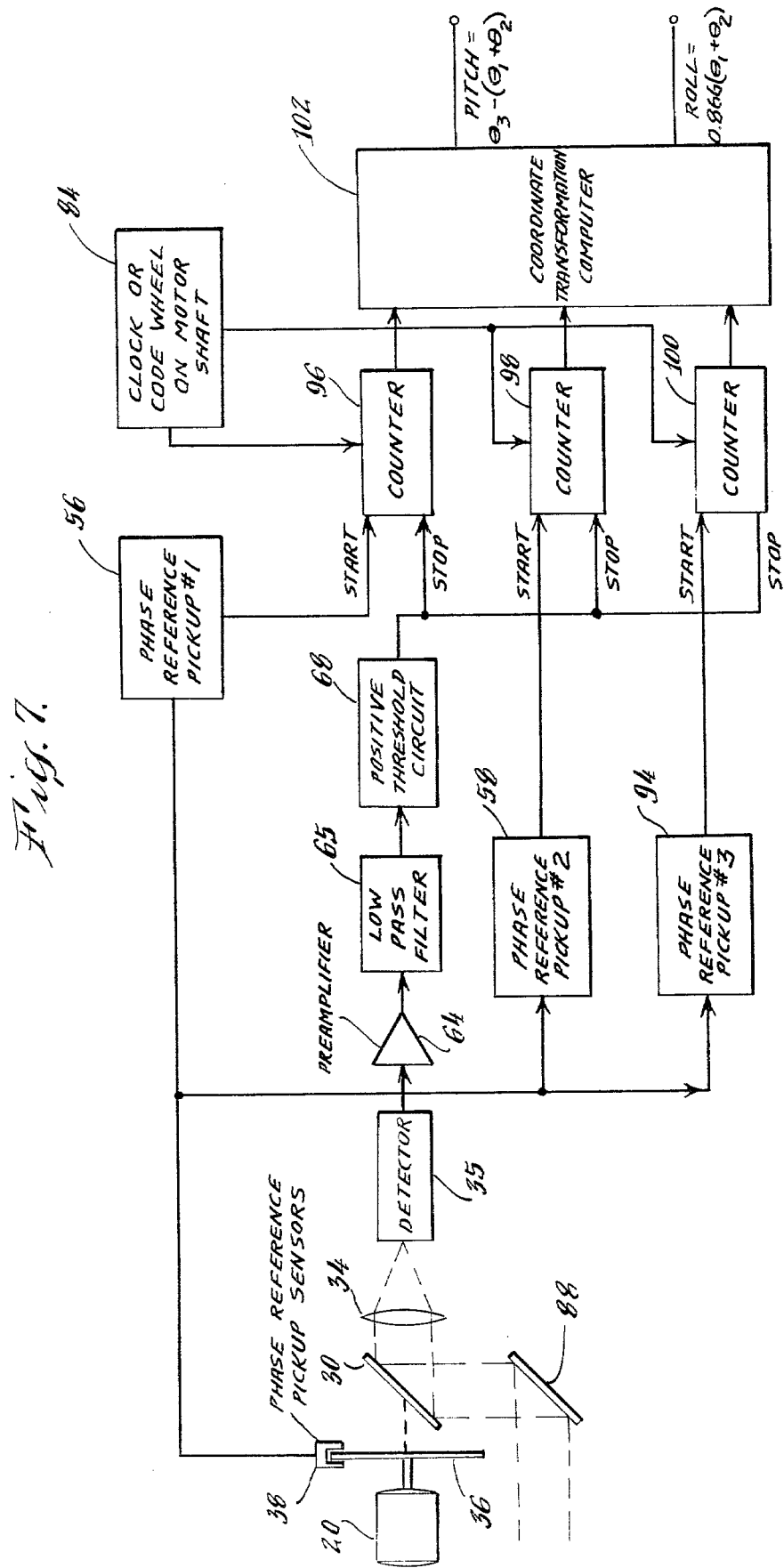
FIG. 7 is a system block diagram generating attitude control signals utilizing the star horizon sensor embodiment illustrated in FIGS. 5 and 6.

FIG. 7 illustrates one form of circuitry for achieving a two axis attitude readout from the star scan pattern illustrated in FIG. 6. In the configuration of FIG. 7, a third phase reference pickup generator 94 is provided so that a phase reference signal is provided at points in space on all three legs of the star scan pattern. As before, radiation applied from the field of view by the rotary scanning mirror 30 and the three stationary radially flat mirrors 88, 90 and 92 are applied to the detector output which is amplified in the preamplifier 64 and applied to a low pass filter 65 and from there to a positive threshold circuit 68 which identifies and detects a horizon crossover point on the planet disc 55. The output of the positive threshold circuit is applied to the stop inputs of counters 96, 98 and 100. The counters 96, 98 and 100 are started by the generation of reference signals from phase reference 56, 58 and 94, respectively. Accordingly, the count measures the time interval between reference pulses and the horizon crossings for the three scan lines of the star scan pattern. The outputs of the counters which are stopped at the occurrence of their respective horizon crossings are applied to a coordinate transformation computer 102 which calculates the pitch and roll error signals. The pitch angle equals $\theta_3 - (\theta_1 + \theta_2)$ while the roll angle equals $0.866 (\theta_1 + \theta_2)$.

Referring now to FIGS. 8 and 9 an embodiment of the present invention is provided which produces orthogonal scan planes which is quite similar to that for producing the parallel scan planes as illustrated in FIG. 1. The orthogonal scan planes are provided by adding two additional mirrors orthogonal to the mirrors illustrated in the embodiment of FIG. 1 in a manner illustrated in FIG. 8. Parallel plane mirrors 104 and 106 are positioned on opposite sides of the rotating optical element 30 along with mirrors 108 and 110 which are also parallel to each other and located on diametrically opposite sides of the rotating element 30 as well as being orthogonal with respect to the elements 104 and 106. The four mirrors 104, 106, 108 and 110 form two pairs of parallel scan planes which are orientated orthogonally with respect to each other when all of the mirrors are 45° from the optical axis 50. The rotating scanning mirror 30 causes the detector 35 to scan a horizontal circle which is intercepted by four plane mirrors 104, 106, 108 and 110 each of which subtend 90° of the scan. The mirrors convert the horizontal circle to four 90° sections of vertical great circles which cross orthogonally at the nadir in alternating directions as shown in FIG. 9. For an infinitesimally small aperture, the field of view would instantly jump from one end of one scan line to the beginning of the next (from point 1 to point 2 in FIG. 9) and for a finite aperture, the field of view fades out at the end of each scan line while simultaneously fading in at the beginning of the next.

As the scanning mirror 30 rotates through 360°, the field of view of the detector 35 appears on each mirror 104 through 110 in turn which produces a "tic-tac-toe" scan pattern when projected on the planet disc 55. Since each pair of opposite scan planes are mutually parallel and separated only by a few inches, this effectively produces two orthogonal scan planes which are practically on top of each other as illustrated in FIG. 9. By providing a different angle for opposite pairs of plane mirrors 104, 106, 108 or 110, a true tic-tac-toe scan pattern may be provided. Such a pattern may be useful for certain applications.

Figure 10:
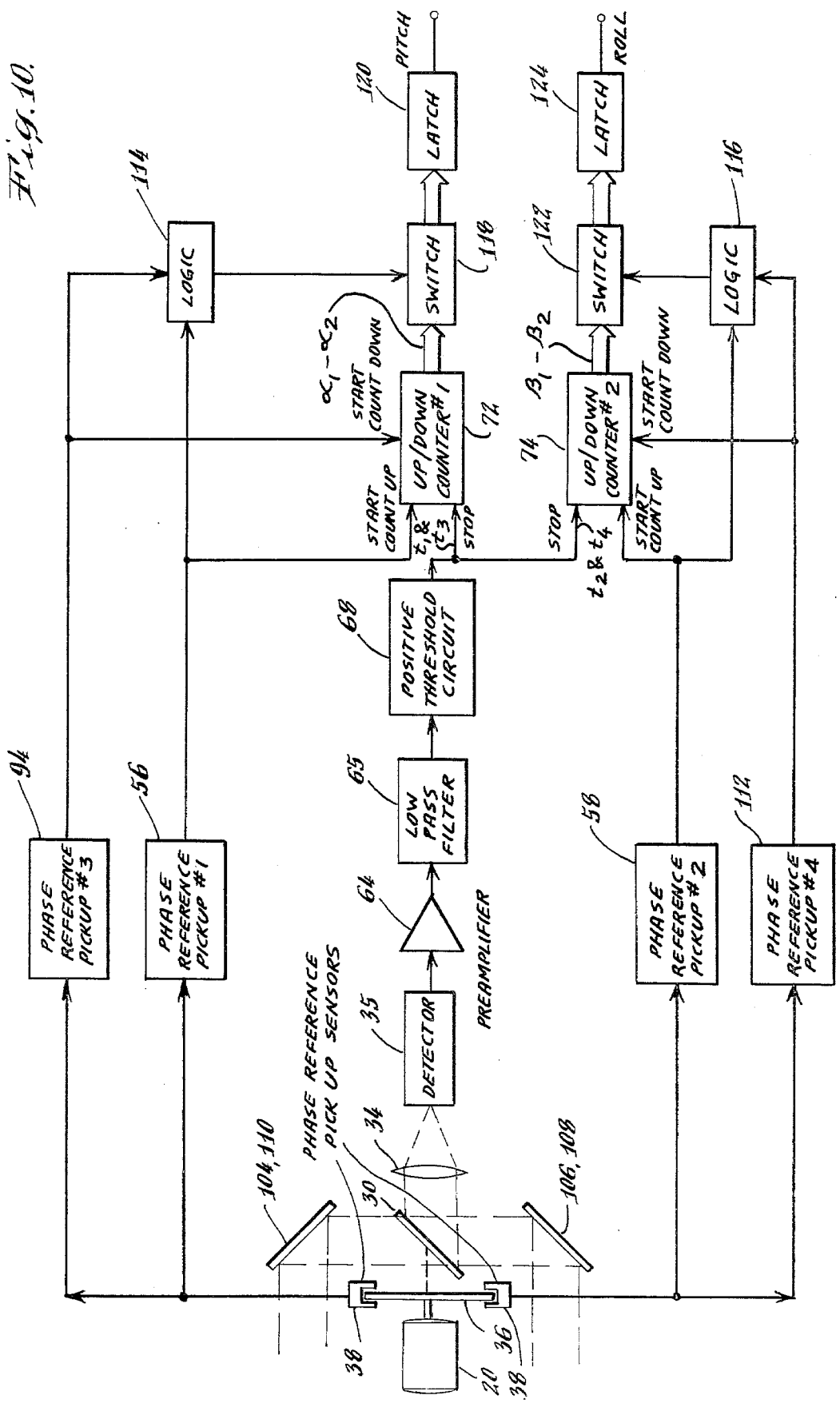
FIG. 10 is a system block diagram for the cross scan horizon sensor utilizing four fixed mirrors as illustrated in the embodiment of FIGS. 8 and 9.

The orthogonal scan pattern embodiment illustrated in FIG. 8 is quite useful in processing the error signals since four space to planet crossings are available from the scan pattern which increases the accuracy and lessens the error. One circuit configuration for deriving the pitch and roll tilt signals is illustrated in FIG. 10. In this embodiment as well as the others only space to earth crossings are used in the processing which greatly simplifies precise identification of the crossover points since any electronic phase lag effects will always be equal and opposite and hence cancel. As in the embodiment of FIG. 7, the phase reference signals are generated on the space side of the scan as illustrated in FIG. 9. In order to provide the four reference pickups, an additional phase reference pickup 112 is provided in the circuit of FIG. 10. Phase reference pickups 56 and 94 for generating PRP #1 and PRP #3, respectively are fed to up/down counter 72 and to logic circuit 114. Phase reference pickups 58 and 112 which generate PRP #2 and PRP #4, respectively are coupled to the up/down counter 74 and to logic circuit 116. The output of up/down counter 72 is applied to a switch 118, also having logic 114 coupled thereto, the output of which is coupled to a latch 120 whose output corresponds to the pitch error signal of the system. Up/down counter 74 is coupled to a switch 122, also having logic 116 coupled thereto, whose output is coupled to a latch 124 which provides roll error signals from the output thereof.

In operation, reference signal PRP #1 applied from reference pickup 56 starts the count up in up/down counter 72. When the horizon crossing takes place at time $t_1$, the positive threshold stops the up count on the up/down counter 72. The time interval between PRP #1 and $t_1$ is equal to $\alpha_1$. The next phase reference signal PRP #2 starts the up count on up/down counter 74 which is stopped on the next horizon crossing $t_2$ corresponding to $\beta_1$. PRP #3 phase reference pickup 94 then starts the down count in up/down counter 72 which is stopped at time $t_3$ the next horizon crossing. The output of the counter 72 which is $\alpha_1 - \alpha_2$ is transferred by the switch 118 activated by logic 114 which in effect identifies which leg of the orthogonal scan is being completed to latch 120, the output of which provides a pitch error signal. PRP #4 then starts the count down in up/down counter 74 which is again terminated at time $t_4$ the next horizon crossing with the interval between PRP #4 and $t_4$ identified as $\beta_2$. The output of the counter 74 is transferred by the activated switch 122 to latch 124 which is an indication of the roll error being $\beta_1 - \beta_2$. The planet disc 55 illustrated in FIG. 9 indicates the orthogonal scan as performed by the scanner illustrated in FIG. 8 is centered on the planet's disc with no pitch and roll error. The dotted configuration for the planet disc 55 would indicate a shift in the pitch axis.

It should be pointed out that the horizon sensor 10 would normally utilize optical radiation in the infrared range and particularly in the 14 to 16 micron carbon dioxide band because of the uniformity of the horizon profile over all atmospheric conditions. Accordingly, the infrared detector must be sensitive to this range and may be made selectively so by filtering or other techniques. The uniformity of the horizon profile permits accurately locating a point within the profile which will always be at a fixed altitude above the true horizon and accordingly the horizon can be located to an accuracy much better than the thickness of the atmosphere. At low satellite altitudes, the atmosphere subtends about 1° and this feature is essential to get accuracies of 0.05° to 0.1°. At higher altitudes, however, the entire atmosphere which can be considered to be 20 miles in depth subtends only 0.05° and accordingly the horizon profile becomes negligible. Therefore, the spectral band can be expanded beyond the 14 to 16 micron carbon dioxide band range in order to obtain more energy which will provide better noise-limited accuracy. Since it is undesirable to have too much variation in limb radiance over the earth, the $8\mu$ to $12\mu$ atmospheric window must be rejected, but the $20\mu$ to $40\mu$ rotational water vapor region can be used. By combining the carbon dioxide band and the water vapor bands along with the interum $16\mu$ to $20\mu$ band, a considerable increase in infrared energy will be available to provide greater accuracy. In order to obtain the advantages of this expanded band, namely the $14\mu$ to $40\mu$ spectral region such a band can be isolated by making use of residual ray reflectivity characteristics of lithium fluoride which has excellent transmission from the ultraviolet band up to $8\mu$ and absorbs strongly between $8\mu$ and $14\mu$. Beyond $14\mu$ and out to $40\mu$, the lithium fluoride becomes highly reflective and this reflectivity which commonly occurs after a strong absorption band is known as the residual ray or reststrahlen phenomenon. Applying this principle to the present invention by making the rotary mirror 30 in the turret 28 of lithium fluoride and blackening the backside of the mirror with a black paint, all wave lengths shorter than $14\mu$ will either be transmitted through the mirror 30 or absorbed by the paint or absorbed by the lithium fluoride mirror itself. Of course, greater spectral isolation could be achieved by also making the two, three or four plane mirrors of lithium fluoride but this is not believed necessary.

It will be apparent from the above invention that a family of horizon sensors are provided in which a plurality of different scan patterns as well as processing techniques are available to provide two axis information utilizing a single rotating element, a single set of optics and a single detector all housed in a single unit. The structure of the present sensor 10 also has the added facility of being able to be converted into a conical scan sensor simply by removing the stationary mirrors and changing the angle of the rotating mirror 30 to perform the conical scan. The same basic structure and similar processing techniques can be utilized with the conical scan but, of course, two sensor heads spaced 90° apart in the vehicle will be required to obtain two axis information.

Since other changes and modifications varied to fit particular operating requirements and environments will be apparent to those skilled in the art, the invention is not considered limited to the examples chosen for purposes of illustration, and covers all changes and modifications which do not constitute a departure from the true spirit and scope of this invention.

What is claimed is:

1. A horizon sensor for indicating orientation by sensing a line of discontinuity in optical radiation in a field of view between a reference body and outer space in at least two planes using a single sensor comprising:

detector means positioned on the optical axis of said sensor for detecting said optical radiation and generating detector signals in accordance with the intensity of said optical radiation, scanning means having a scanning axis of rotation which coincides with said optical axis for scanning said line of discontinuity in at least two planes and applying said optical radiation to said detector means, said scanning means having a rotary reflecting element with at least two stationary reflecting elements mounted in predetermined positions around said rotary reflecting element, the reflecting surfaces of said reflective elements being disposed at less than 90° with respect to said optical axis, said reflecting elements facing said body, driving means for rotating said rotary element of said scanning means, reference signal generating means coupled to said driving means and being driven in synchronization therewith for generating reference signals at predetermined points in the scan of said scanning means, electronic means having said reference signals and said detector signals coupled thereto for measuring the intervals between said reference and detector signals and providing therefrom output signals indicative of the attitude of said horizon sensor in two mutually perpendicular axes with respect to said reference body.

2. The horizon sensor set forth in claim 1 in which said scanning means has three stationary reflecting elements radially mounted around said rotary reflecting element.

3. The horizon sensor set forth in claim 1 wherein said scanning means has four stationary reflecting elements mounted around said rotary reflecting element, said four stationary reflecting elements comprising two pairs of parallel elements with the pairs being orthogonally positioned with respect to each other.

4. The horizon sensor set forth in claims 1, 2 or 3 in which said rotary reflecting element of said scanning means is made of lithium fluoride.

5. The horizon sensor set forth in claims 1, 2 or 3 in which said rotary reflecting element and said stationary reflecting elements of said scanning means all make an angle of 45° with respect to said optical axis.

6. A horizon sensor having an optical axis comprising:

an infrared detector positioned on said optical axis, scanning means having an axis of rotation which coincides with said optical axis for applying an infrared beam from at least two planes across a field of view to said infrared detector, said scanning means having a rotating reflecting element mounted for rotation about said axis of rotation and at least two stationary reflecting elements mounted around said rotating reflective element in predetermined relation with respect to each other and said optical axis, the reflective surfaces of said reflective elements forming an angle of less than 90° with said optical axis and being aimed at said field view, drive means for rotating reflecting said rotating element thereby scanning said infrared detector over said field of view, reference signal generating means driven by said drive means in synchronism with said scanning means for generating reference signals at predetermined times during each revolution on said scanning means, means having said reference signals and said detector signals applied thereto for providing output signals which measure the rotational intervals between said detector signals and said reference signals.

7. The horizon sensor set forth in claim 6 in which said scanning means comprises two diametrically opposed reflecting elements mounted on opposite sides of said rotating reflecting element.

8. The horizon sensor set forth in claim 6 in which said scanning means has three stationary reflecting elements radially mounted around and equally spaced from said optical axis.

9. The horizon sensor set forth in claim 6 wherein said scanning means has four stationary reflecting elements mounted around said rotary reflecting element, said four stationary reflecting elements comprising two pairs of parallel elements with the pairs being orthogonally positioned with respect to each other.

10. The horizon sensor set forth in claims 6, 8 or 9 wherein said drive means comprises a hollow shaft motor, said optical axis coinciding with the axis of rotation of said hollow shaft motor.

11. The horizon sensor set forth in claims 6, 8 or 9 wherein said rotary element is made of lithium fluoride.

12. The horizon sensor set forth in claims 6, 8 or 9 wherein said stationary reflecting elements and said rotary reflecting element of said scanning means are all inclined at a 45° angle with respect to said optical axis.

* * * * *